United States Patent
Gurin

(12) 
(10) Patent No.: US 10,492,023 B1
(45) Date of Patent: Nov. 26, 2019

(54) DYNAMIC RESOURCE LOCATION COORDINATION CONTROL SYSTEM

(71) Applicant: Michael Gurin, Glenview, IL (US)

(72) Inventor: Michael Gurin, Glenview, IL (US)

( * ) Notice: Subject to any disclaimer, the term of this patent is extended or adjusted under 35 U.S.C. 154(b) by 0 days.

(21) Appl. No.: 16/367,203

(22) Filed: Mar. 27, 2019

Related U.S. Application Data

(60) Provisional application No. 62/648,952, filed on Mar. 28, 2018.

(51) Int. Cl.
*H04W 64/00* (2009.01)
*H04W 4/021* (2018.01)
*H04W 4/029* (2018.01)

(52) U.S. Cl.
CPC ........... *H04W 4/021* (2013.01); *H04W 4/029* (2018.02)

(58) Field of Classification Search
None
See application file for complete search history.

(56) References Cited

U.S. PATENT DOCUMENTS

2019/0172367 A1* 6/2019 Vuillerme ............ A61B 5/1126

* cited by examiner

*Primary Examiner* — Suhail Khan

(57) ABSTRACT

A system and method for location centric activity leveraging convergence control of vectors having both a time and space domain. Additionally, the system executes the control of mobile and dynamic resources by controlling the dispatch of primary tasks with intermediate secondary tasks to enhance system efficiency and effectiveness. The location convergence of multiple mobile resources is vital to the realization of high-accuracy location determination and therefore high-accuracy inference and contextual relevance.

19 Claims, 7 Drawing Sheets

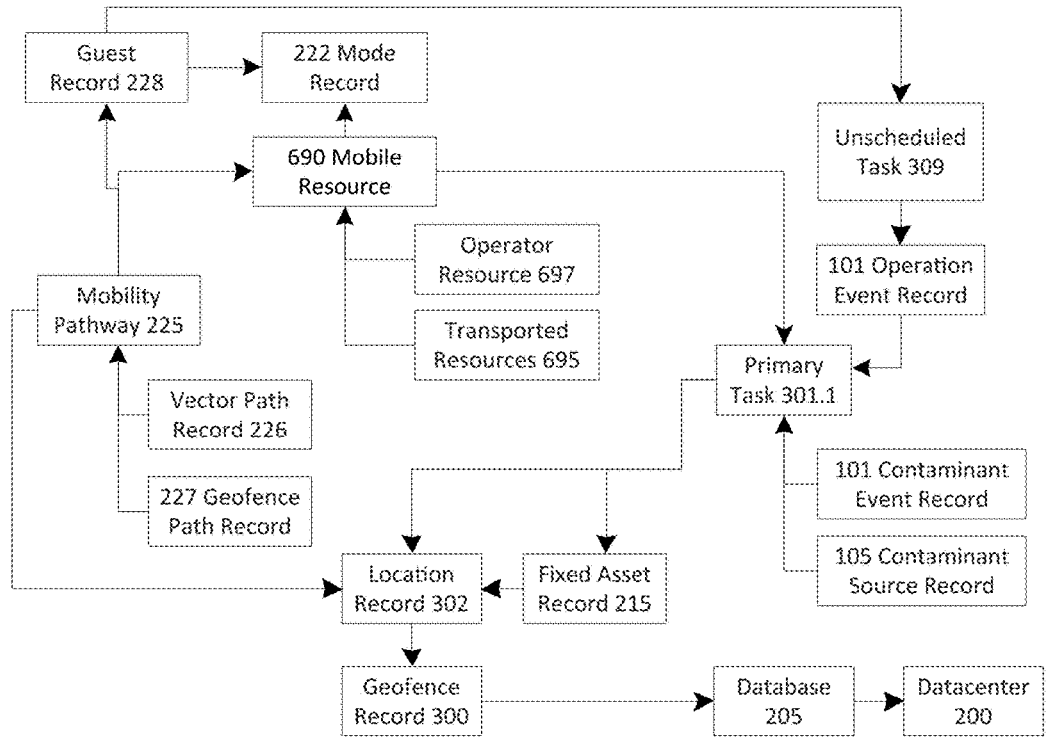

| Electricity Production Historic f(t) | Electricity Consumption Historic f(t) | Demand Consumption Historic f(t) | Demand Production Historic f(t) |
|---|---|---|---|
| Vehicle Transport Route Historic f(t) | Electricity Rate Structure Historic f(t) | Electricity Demand Rate Historic f(t) | Vehicle Transport Rate Structure Historic f(t) |
| Transactions Inflow : Outflow Ratio Historic f(t) | Distance & Route Historic from RS(s) as f(t) | Vehicle Transport Cargo Utiization Historic f(t) | Vehicle Transport Energy Utilizaion Historic f(t) |
| Electricity Production Projected f(t) | Electricity Consumption Projected f(t) | Demand Consumption Projected f(t) | Demand Production Projected f(t) |
| Vehicle Transport Route Projected f(t) | Electricity Rate Structure Projected f(t) | Electricity Demand Rate Projected f(t) | Vehicle Transport Rate Structure Projected f(t) |
| Transactions Inflow : Outflow Ratio Projected f(t) | Distance & Route Projected from RS(s) as f(t) | Vehicle Transport Cargo Utiization Projected f(t) | Vehicle Transport Energy Utilizaion Projected f(t) |

US 10,492,023 B1

DYNAMIC RESOURCE LOCATION COORDINATION CONTROL SYSTEM

CROSS-REFERENCE TO RELATED APPLICATIONS

This application claims the benefit of provisional patent application U.S. No. 62/648,952 titled "Dynamic Resource Location Coordination Control System" filed on Mar. 28, 2018, and hereby incorporated by reference in its entirety.

This patent document contains material subject to copyright protection. The copyright owner, also the inventor, has no objection to the reproduction of this patent document or any related materials, as they appear in the files of the Patent and Trademark Office of the United States or any other country, but otherwise reserves all rights whatsoever.

FIELD OF INVENTION

The present invention relates to mobile resource equipment operable to perform primary and secondary tasks that are specifically operated in accordance to parameters that are location-specific including through the coordination and scheduling control system to leverage multi-dimensional location vectors (i.e., space domain) with each vector comprised of a second dimension representing the time domain, including color (or other digital, discrete though greater than binary representation) of time between a known starting time and known ending time. The multiple time-domain and space domain location coordination control system has suitability in a wide range of location-dependent applications ranging from transporting people or containers, operating and/or characterizing modes (whether it be for equipment or people), cleaning, shopping, etc. in at least one geofence location having embedded known locations further having embedded sub-areas of at least two dimensions (e.g., X, Y) in which pathways (i.e., physical space "space") exist as represented by multi-dimensional location vectors to increase task performance effectiveness.

BACKGROUND OF INVENTION

Prior art includes the utilization of vectors to represent travel in multi-dimensional (X,Y,Z) space domain, but not without significant calculation intensity to determine convergence or intersection points of multiple vectors along a pathway for BOTH time and physical space, as the prior art use of vectors doesn't provide a method for which the vectors can be rapidly (and visually) represented such that convergence of multiple vectors (aggregated as a pathway for a particular mobile device) can leverage pattern-recognition to identify convergence points in approximately the same time domain. In other words, the prior art can't utilize pattern recognition methods to rapidly achieve computationally efficient means in identifying convergence or intersection points that occur at approximately the same time.

Prior art such as scheduling systems for task management also fail to fundamentally integrate resource optimization in which tasks are both location and time constrained.

A need exists to maximize the utilization rate of mobile resources, including when the mobile resource has the opportunity to perform both primary and secondary tasks that are location-dependent exist including the objective of maximizing task effectiveness beyond simply optimizing mobile resource utilization.

SUMMARY OF INVENTION

The present invention is a dynamic resource location coordination control system "DRS" with integral and networked functionality amongst a fleet of mobile resources operational to perform both primary and secondary tasks.

A further object of the invention is to enable the control system to be computationally efficient with a multi-domain vector system having both time and space domain optimized for pattern recognition in determining vector convergence for approximately equal time domains.

Another object of the invention is to rapidly identify convergence points within the approximately same time domain of multiple mobile resources.

Yet another object of the invention is to control the operations of mobile resources that are executing tasks in a dynamic manner specific to the location based on activity pathways represented by the multi-domain vectors.

Another object of the invention is to retroactively utilize the multi-domain vectors to improve location-specific predictions in the future in real-time, such that the accuracy of predictions is increased by at least 5%.

Yet another object of the invention is to integrate components and system design features to create and coordinate active preventative measures in response to system detection measures.

An object of the invention is optimizing the performance of primary and secondary tasks such that the secondary tasks have minimized noise impact, particularly when based on location-specific conditions in which the secondary task should be executed.

Yet another aspect of the invention is to accelerate identification of clustering convergence to then enable superior pattern recognition within the resulting clusters.

Another objective of the invention is to improve a wide range of applications that benefit from improved pattern recognition driven by location-based clustering to enhance contextual relevance and accuracy of big data through location derived mode (segmentation), decrease cross-contamination in public spaces, task performance including cleaning and logistics, optimize routing, and to reduce task performance cost through the combination of increased utilization rates and reduced capital costs.

Yet another objective of the invention is to leverage distributed ledger for comprehensive location tracking by utilizing dynamic encryption and decryption keys based on location specific modes for each mobile resource thus ensuring privacy while improving contextual relevance for each mobile resource to increase task effectiveness.

Yet another objective is to apply the core invention of location convergence in both time and space domain for multiple overlapping mobile resources to achieve numerous benefits including reduced fraud incidences, infection rates, task specific use of capital resource and its associated greenhouse gas emissions.

All of the aforementioned features of the invention fundamentally recognize the coupling of location convergence in the time and space domain to vary the operations of mobile resources.

BRIEF DESCRIPTION OF DRAWINGS

FIG. 5 is a data structure for the mobile resource.

FIG. 6 is a data structure for the mobile resource use case of energy transporter.

DEFINITIONS

Figure 1:
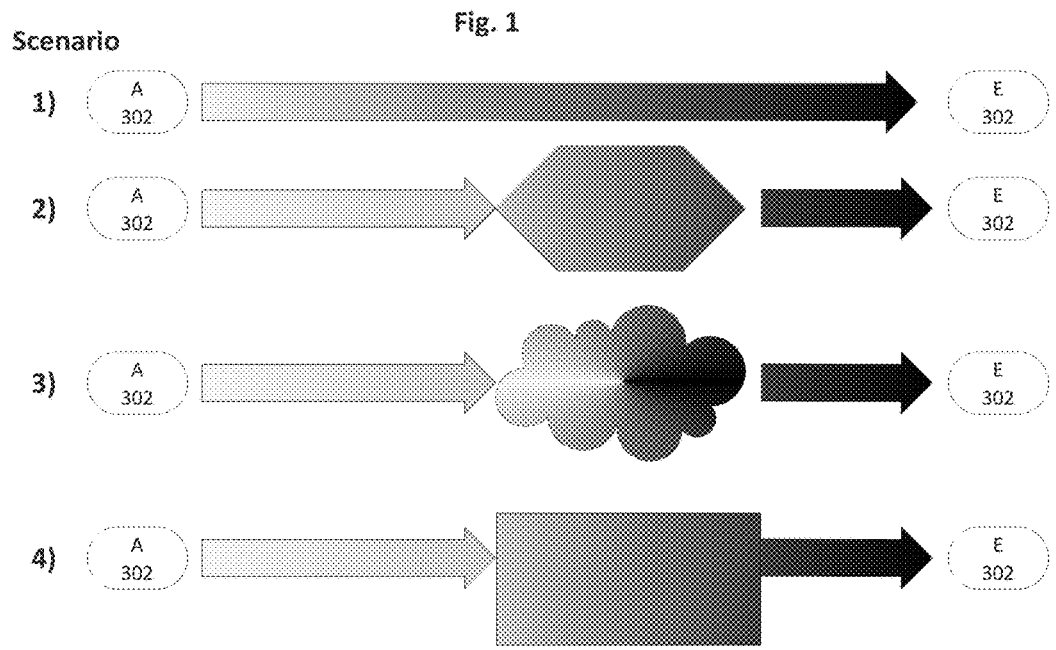
FIG. 1 is a top view illustration, having multiple scenarios, of vectors with probability gradients.

The term "vector convergence" is the intersection of multiple vectors within an overall travel pathway in approximately the same time (i.e., within a parameter of time threshold) and approximately the same space (i.e. within a parameter of distance threshold).

The term "color" is an at least one additional dimension added to the vector representing a travel pathway in at least a two-dimensional space, such that vectors show in a visual manner the intersection of travel pathways for multiple mobile resources where the "color" is any visual or digitally represented parameter in which a pattern recognition method finds at least one point having location convergence in time and space domain with a computational efficiency of at least 10% lower than a system having vectors without color.

The term "location convergence in time and space domain" is the intersection of each mobile resource pathway as represented by vectors or geofences with vectors in approximately both the same time and space domains.

The term "retroactive" is the determination of any parameter, notably location, such that looking back in time improves data accuracy, reduces probability errors, and reduces frequency of data gaps with the specific intent of providing superior location accuracy in the future even in the presence of data gaps (i.e., incomplete vector pathway for the travel of a mobile resource).

The term "mode" is a characterization of a mobile resource into segmented context by at least two locations, one of the current locations and the other of a dynamically altering location as a function of time, co-located mobile resources, or adjoining geofences. The preferred embodiment determines mode through the utilization of at least three locations comprised of current location, past location(s), future location(s) centered around a specific user. The particular preferred embodiment determines mode by at least three locations for multiple interacting users.

DETAILED DESCRIPTION OF INVENTION

Here, as well as elsewhere in the specification and claims, individual numerical values and/or individual range limits can be combined to form non-disclosed ranges.

Exemplary embodiments of the present invention are provided, which reference the contained figures. Such embodiments are merely exemplary in nature. Regarding the figures, like reference numerals refer to like parts.

The invention significantly reduces the incidence and contamination of contagious disease states across the combination of multiple time and space domains.

Location Determination Functions

A critical feature of the system is to determine the location of a mobile resource accurately, at least relative to a location in which a task must be performed. An even more critical feature of the system is to determine converging intersection points on a time and space domain (i.e., overlapping vectors predominantly matter when they occur in approximately the same time). It is an object of the system to represent location, as represented by a vector when it is precisely and accurately known in a gradient (preferably a color, or as known in the art any numerical representation of a color or pattern that varies as a function of time (such that like colors represent like time) and from the start of the vector to the end of the vector based on time. When location is not precisely known, it is represented by a geofence. The geofence is optimally represented by a varying probability gradient, in which the probability gradient provides a relatively higher projection of actual location likelihood. The probability gradient is established by the combination of historic records establishing a pattern of travel times between known precise locations (e.g., points in which known tasks are performed at known locations, or GPS determined locations in which it is known that location error is less than a specific error threshold limit in percentage or absolute length) such that future times in which travel between the same known locations enables an increased accuracy of precise locations in between those same known locations (that otherwise have location errors that are beyond the specific error threshold limit. The location vector has an integral color (or pattern) that varies along the time domain, such that the key differentiation is a visually recognizable similarity function (i.e., the human eye or graphical processing unit recognizes the color or pattern at a point of convergence as being approximately identical, at least within a similarity threshold limit). When the location has a degree of uncertainty the location vector is represented by a geofence vector having an integral color (or pattern) along with an optional probability profile (or a probability map of individual locations based on known prior high-certainty locations, or additionally in combination with future known (or anticipated) high-certainty location(s) when looking forward in time). This feature of the invention also enables superior accuracy of retroactive location gap filling.

Figure 10:
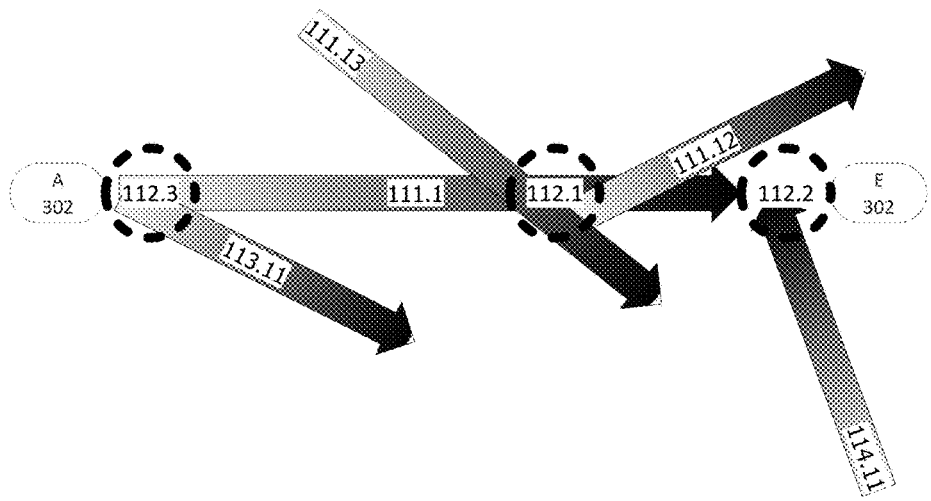
FIG. 10 is a top view illustration depicting vectors converging in both time and space domains.

Turning to FIG. 10, FIG. 10 depicts vectors representing the movement between locations, such as the first location A302 to the second location E302, with each individual vector represented both by directionality and color gradient (in this case as shown in black and white with shades of grey). The exemplary instance shown clearly shows convergence of space and time (as indicated by dashed circles) at convergence point 112.3 for vectors 113.11 and 111.1, as well as convergence point 112.1 between vectors 111.13 and 111.1 (and clearly not 111.12 due to different color, meaning no convergence of time but only space). Convergence point 112.2 at location E302 is for vectors 111.1 and 114.11.

Turning to FIG. 1, FIG. 1 depicts four scenarios of a vector starting at first location A302 to an ending location E302. Each vector can range from Scenario 1 that depicts an instance where the precise location is known from start to finish, Scenario 2 that depicts a region in which precise location is not known (such that the probability varies from an intermediary location in which two precise tasks occur at a precise location and precise time but in between those two tasks precise location becomes unknown and the time in between each task establishes a relatively linear probability gradient, Scenario 3 is similar to Scenario 2 except that probability gradient is not linear (such as where a wireless signal has more variation such as created by interference of doors, walls, etc.), and Scenario 4 in which no known information is available between the two precise tasks and therefore the probability gradient is large and relatively non-deterministic in between the two precise tasks.

Known locations are established by multiple means including the performance of a task through a device having a known location in which the device communicates via wired (e.g., Ethernet) or wireless (e.g., low-energy Bluetooth, NFC) such that the highest accuracy of location is established by either the fixed location Ethernet or the wireless method with the lowest range.

It is a feature and an object of the invention to fill in the gaps of location knowledge, whether the prior knowledge of a precise location is not known at all or the location is represented in the past by a geofence (preferably with a probability gradient), such that the gap(s) is replaced by a precise vector (or simply a geofence having a more precise probability gradient). One instance in which precise location knowledge is desired, even though the mobile resource is no longer at that location, is in establishing likelihood of cross contamination retroactively after an infection has been obtained, transaction fraud prior to the shipment of an ecommerce order, and projections of future location when resources travel relatively repetitive routes (such as employees within a hospital). It is a feature and an object of the invention to maintain historic location data as obtained in real-time for each location (preferably on a continuous vector mapping) with a set of non-real-time adjusted location data such that the combination of the real-time location and the non-real-time location adjustment provides a more precise predicted real-time location. It is understood that the non-real-time location adjustment is a function of at least one of the precise location or the real-time location point. The non-real-time location adjustment is preferably also a function of the actual mobile resource and optionally also as a function of time. The particularly preferred non-real-time location adjustment is further as a function of a known presence of an at least a second mobile resource object or an at least first inanimate object (which can have more than one position e.g., door that is open or closed) that in fact impacts the location precision when the first mobile resource is in proximity with the at least a second mobile resource. Retroactive improvements of location data occur by analytical inclusion of subsequent data records through knowledge of then future performance of primary tasks or secondary tasks at known locations. More specifically, there are gaps of precise (or even general) location knowledge that occur (most notably from loss of location-determination signals e.g., global positioning systems "GPS" whether the GPS is an indoor or outdoor GPS or simply uses wireless triangulation as known in the art) such that during the occurrence of a particular task (or event, such as opening a door as the mobile resource moves between locations) the precise location is not yet known. Yet, when the mobile resource performs a task or event at a both known time and known location (or within a known geofence) this action establishes a probability profile for past tasks or events (in other words, if a task took place on the $2^{nd}$ floor of a hospital at 11:00.00 AM there is a very low probability that the same mobile resource would be on a floor above or below the $2^{nd}$ floor at 10:59.50, especially if the location is not near an elevator or staircase, or if it is known with certainty that no mobile resource was located in an elevator or staircase in between those times). The inventive system uses both known occurrences of an at least one second task in terms of precise time and location, and/or known absences of tasks in terms of precise time and location, or combinations thereof to establish a location probability for a first task in terms of precise time and location that is a function of precise time and location for the at least one second task, and/or for the known absence of tasks within a precise location (or geofence) within a known time range.

It is another object of the invention to create a comprehensive record of location as a function of time for each mobile resource, recognizing that a mobile resource can be a person guided device, a semi-autonomous or autonomous guided device, or even a person qualified to execute primary and/or secondary tasks such that the person is mobile and the device that the person uses has no independent means of movement. When location data is for a specific person the maintenance of personal privacy is essential. Yet, serving the specific person (i.e., operator) with superior precision requires extraction of location knowledge. It is an object of the invention to segment the access to personal location data notably by leveraging a distributed database (with multiple encryption keys, preferably with access control by a function of both a mode and a geofence) also referred to as a distributed ledger such that the distribution of location data is by at least one of a) mode, b) geofence, or specific data server representing location data by a combination of mode and geofence. It is recognized that specific geofences maintain data that is not only proprietary to the individual person but also business or contextually sensitive to the host business/purpose of that specific geofence. One exemplary host business is a hospital (or medical campus) in which strict privacy laws provide guidance and control of access to sensitive location data linked to a specific individual person. Yet, it is an object of this invention to repackage this highly sensitive comprehensive location into reduced sensitivity packets. The distributed ledger of location data is segmented by mode (e.g., exercise, home, work, medical, personal, etc.) even within a private geofence. Specifically, the distributed ledger database preferably utilizes rules-based logic and mode functions to create location offsets in which the offset is a function of time, mode, and/or rules-based logic or combinations thereof. The purpose of a location offset is to ensure that the absolute location can't be accessed, yet relative location data can be accessed. One exemplary incidence in which relative location information is desired but absolute location information needs to remain private is an exercise application such that the exercise application desires to calculate or track data including number of steps, calories burned, velocity and/or acceleration rates etc. yet the actual instance that the absolute location is within a hospital or an armed forces forward operating base must remain secret. In the context of a hospital environment a staff member such as a physical therapist is authorized to track physical activity but should not have knowledge of specific activities such as bathroom activity, medical testing procedures, etc. In other words, access to specific location information is a function of at least mobile resources (i.e., the mobile resource requesting information and the mobile resource owning the information). Location offsets are preferably encrypted utilizing a non-linear or linear function that can be further switched between varying non-linear or linear functions in accordance to further rules-based logic as a function of time. Personal location data is segmented into access type between public and private. Private data is provided within the guidelines of secure access in packets that include at least: a) summary of mode data, b) redacted data of specific modes such as healthcare specific modes, c) segmentation data by mode outside of healthcare specific modes, and d) data containing offsets.

Figure 2:
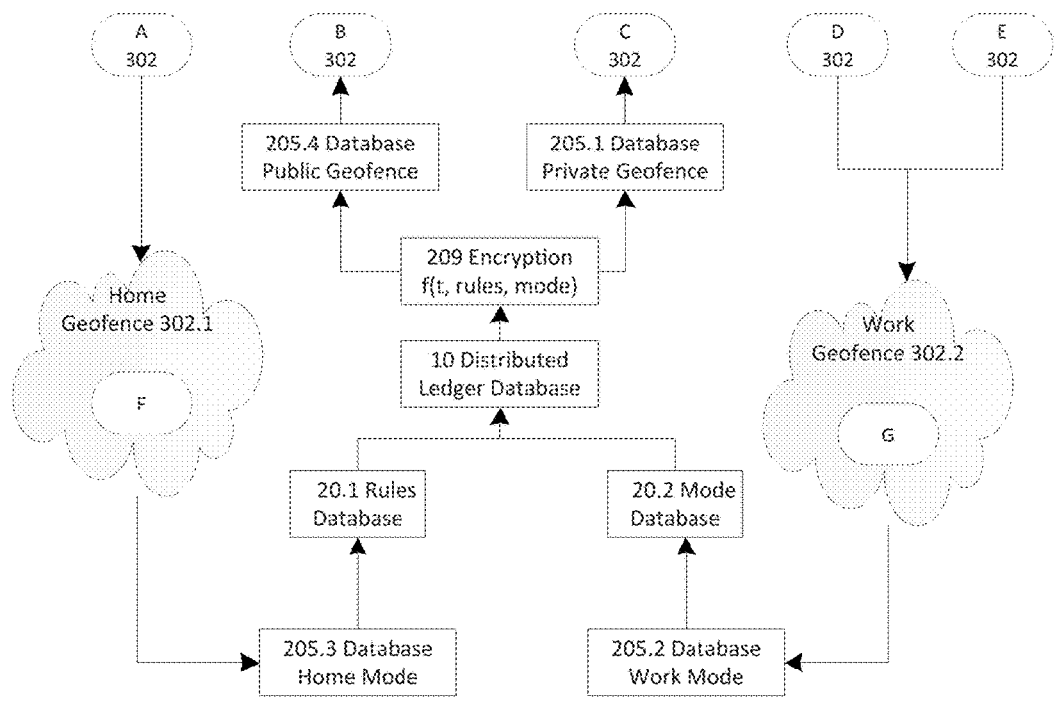
FIG. 2 is a data structure illustration for locations relative to geofence positions.

Turning to FIG. 2, FIG. 2 depicts the data structure for both contextual relevance as well as privacy constraints. Each location A302, B302, C302, D302, and E302 has a record with a parent-child relationship to at least one geofence. It is understood, though not depicted, that any location can have multiple parent-child relationships to multiple geofences with further record connectivity to Public Geofence Database 205.4 (as connected to location B302 which enables less severe access control relative to the Private Geofence Database 205.1 as connected to location C302). The utilization of a Home Geofence 302.1 (as connected with location A302) establishes a fundamental set of privacy rules in accordance to the Rules Database 20 in addition to the Home Geofence 302.1 also having a parent-child relationship to establish the geofence as within an at least one Home Mode with the Home Mode Database 205.3. Home Mode is particularly important in terms of privacy and therefore it is understood that specific Encryption function 209, which is a function of time, rules and mode, is used to severely limit access of such data within a Distributed Ledger Database 10. The Mode Database 20.2, another database similar to the Rules Database 20.1, maintains records of geofences in which relevant modes are possible and respectively relevant rules are possible. Information gathered within a home has particular relevance amongst a family (largely without restrictions) but also provides important marketing consumption info as one exemplary with another exemplary being cleaning or cross-contamination requirements). The performance of cleaning or decontamination tasks in between logistics transport from a first location to a second location within a home. A Work Geofence 302.2 (as connected to locations D302 and E302) also has specific meaning therefore requiring differentiation from other geofence categorizations.

Queuing and Routing of Secondary Task Functions

For the purpose of this invention, a primary task is a task that has a firm commitment to completion within at least a specified time range (beginning at an earliest to complete time through a latest must complete time). Additional parameters for a primary task include having at least one parameter selected from the preferred start time, preferred finish time, and must start time. A secondary task is a task that does not yet have a firm commitment to completion within at least a specified time range, but rather has parameters that provide a relative ranking amongst other secondary tasks (i.e., set of secondary tasks) so as to prioritize the sequential processing of secondary tasks. Given that a mobile resource is often a capital resource (or a human resource) it is advantageous for the mobile resource to maximize the amount of time spent performing both primary tasks and secondary tasks (while minimizing excessive travel time by minimizing routing distance between a first and second location). One exemplary secondary task is reducing the potential for cross-contamination (amongst sequential touch interactions whether it be by a mobile resource, any person (whether it be employee, customer, or guest) at a specific location (or physical object at the specific location e.g., doorknob, sink, elevator buttons, etc.). It is anticipated that a secondary task becomes a primary task in the event that the secondary task has not been performed prior to a specific time, within a certain time interval, or at a rate of completeness within a certain time interval.

In most cases the operating and capital cost of mobile resources (i.e., roaming robotic devices including automated guided vehicles; people in which tasks are conducted at varying locations and a pathway is taken to sequentially perform the tasks) moving from a first location to a second location is a dominant cost. Given that travel costs (i.e., both direct and indirect such as amortization of equipment) are significant, it is an object of the invention to enable the mobile resource to perform both primary and secondary tasks with minimal excessive non-productive travel or time losses. It is understood that particularly for human resources a third category of tasks, hereinafter referred to as "optional mobile resource objectives" are optionally factored in while determining the sequencing of primary tasks and secondary tasks including the travel routing in between the primary and secondary tasks. An instance of the optional mobile resource objective is either the minimization of total travel distance, achieving a total travel distance threshold but then subsequently minimizing an excess beyond the total travel distance threshold, or maximizing a total travel distance such that the act of traveling is in fact an objective (i.e., security control).

Figure 12:
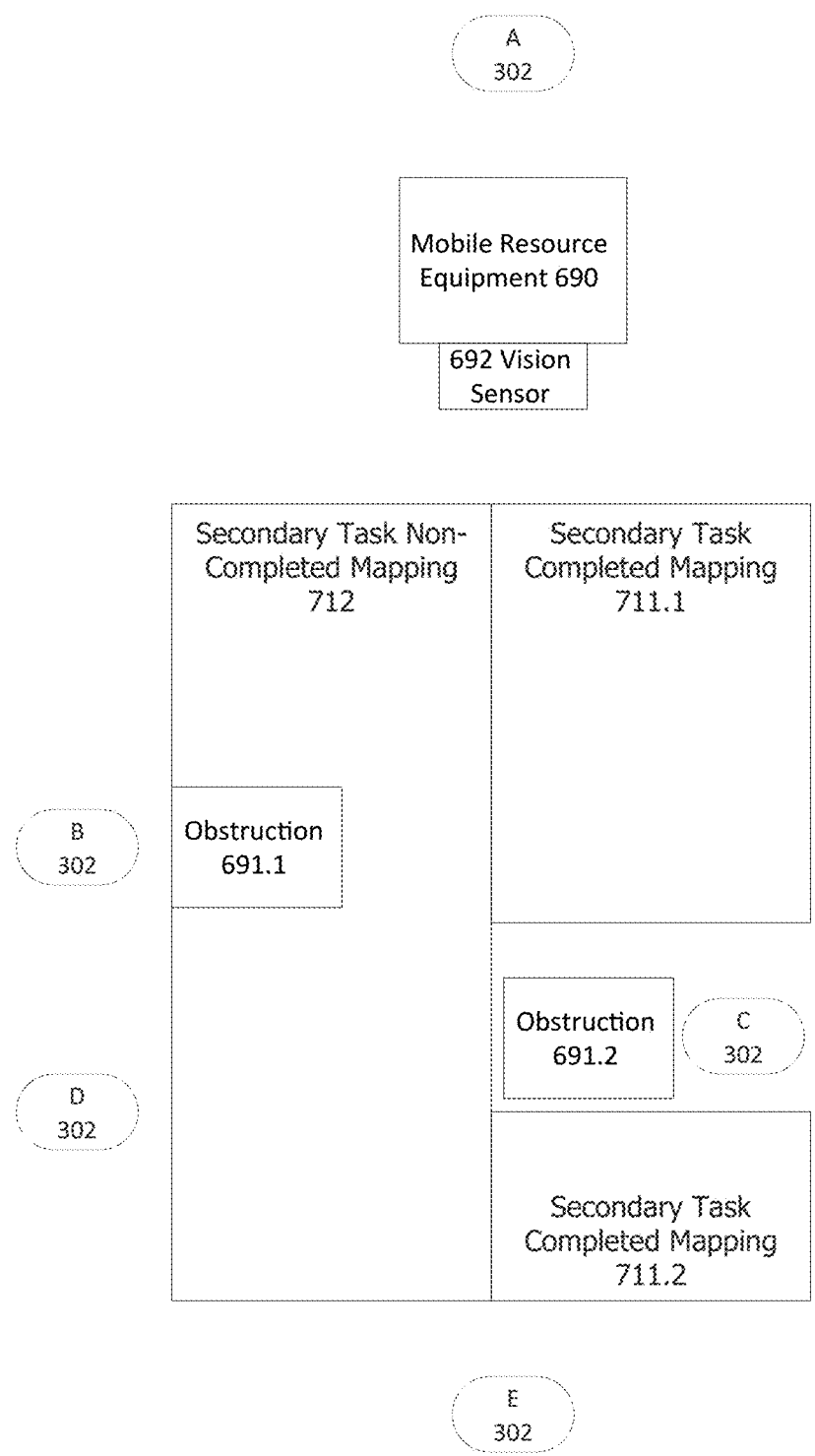
FIG. 12 is a top view of the mobile resource pathway options between a first location and a second location.

Turning to FIG. 12, FIG. 12 depicts the mapping area between a first location A302 having a required first primary task and the ending location E302 having a second primary task with the intermediate locations of B302, C302, and D302 all having consideration of secondary tasks to be completed. In between the first location A302 and the ending location E302 is a mapping of areas in which secondary task has already been completed being the Secondary Task Completed Mapping 711.1 and 711.2, as well as areas in which secondary task has not yet been completed being Secondary Task Non-Completed Mapping 712. The mobile resource 690 is equipped with at least one vision sensor 692 to at the very least determine where obstructions 691.1 and 691.2 exists that trigger dynamic scheduling of secondary tasks by the mobile resource 690 including in instances where delaying travel movement between the first location A302 and ending location E302 after the obstruction 691.1 and/or 691.2 would at worst force the completion of the primary task at ending location E302 to be after its required completion time. Therefore, the routing and scheduling of the secondary tasks are modified in real-time so as to avoid obstructions at least when such delay in travel movement would create missing completion of the primary tasks at ending location E302 (or any subsequent locations in which primary tasks are scheduled) prior to its respective required completion time.

It is further an object of the invention for the dynamic routing and scheduling system to dispatch both travel commands and task performing commands of secondary tasks as intermediate activities. The dispatching of secondary tasks, also referred to as an at least one intermediate activity, to a specific mobile resource (amongst the fleet of available mobile resources) is based on multiple parameters including the suitability, qualification and/or performance rating, cost of operation relative to other mobile resources available, anticipated, or that can be scheduled for a later time (but still earlier than the performed task must complete prior time). It is understood that the suitability and performance rating is preferably a function of both the mobile resource capability and also its operator (when such operator is required) as the resulting performance of the secondary task (as well as primary task) is based on the unique combination of operator on a specific mobile resource (i.e., increasing amounts of training and actual deployment experience on a specific mobile resource by a specific operator increases the certification/qualification). The mobile resource has a range of skills or tasks that it can accomplish with relative and absolute qualification/certification ratings relative to other mobile resources.

One exemplary application is the utilization of the DRS within a hospital or public space such that cross-contamination of a contagious illness/disease can take place. There is a practical limit in terms of frequency of cleaning/ disinfecting that demands a probabilistic or interval-based scheduling to take place. The urgency and therefore the prioritization of schedule is a function of parameters inclusive of probability of disease cross-contamination, seriousness (and/or cost risk) of health consequences to a specific disease in which a mobile resource has a probability of disease cross-contamination, time interval since last antimicrobial disinfectant (i.e., relatively instant kill) treatment, time interval since last antimicrobial persistent treatment, strength of antimicrobial persistent treatment, projected interval between sequential touch interactions, etc.). The mobile resource must be capable of performing all primary and secondary tasks that become scheduled or queued onto that respective mobile resource schedule. It is understood that the execution time of a primary task and/or a secondary task by a specific mobile resource can vary in accordance to the individual capabilities of the task executing equipment onboard to the mobile resource as well as operator performance. Scheduling of secondary tasks also takes into account additional scheduling parameters for the secondary tasks objectives by featuring bonuses for early completion, and penalties for late or partial completion within a mobile resource specific aggregate revenue parameter (which is the summation of individual bonuses or penalties, whether those be based on actual or projected dynamic routing or schedule).

Figure 7:
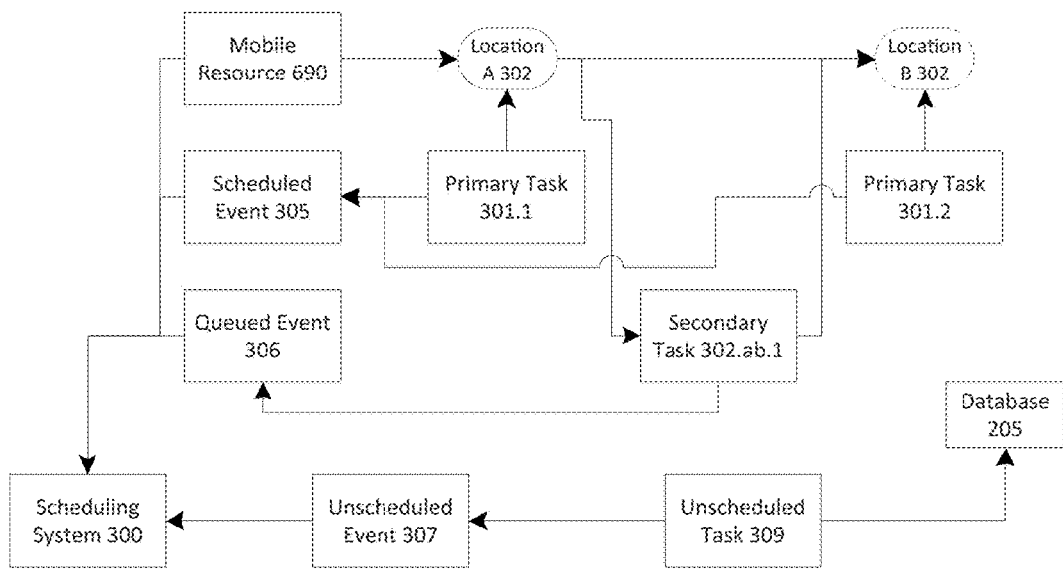
FIG. 7 is a data structure for the mobile resource task scheduling component.

Turning to FIG. 7, FIG. 7 depicts the data structure in a parent-child relationship from a mobile resource 690 perspective notably as it would travel from a first location A302 to second location B302 in its achievement of respectively assigned primary tasks 301.1 and 301.2. The data structure clearly shows at least one secondary task 302.ab.1 having a data structure/name indicating that the secondary task is relevant between the first location "A" and the second location "B" which is queued for completion within a queued event 306 series of records. Each of the primary tasks have scheduled execution times within a series of scheduled event 305 records that are further assigned to a specific mobile resource 690 (including the ability to dynamically assign to the mobile resource in real-time based on availability and/or proximity of mobile resource to actual location. The scheduling system 300 coordinates the execution of both primary tasks and secondary tasks all of which have records within the database 205 where each task is first an unscheduled task 309 becoming linked to a specific unscheduled event 307 (as a function of the task itself) and then finally scheduled and assigned to a specific mobile resource 690.

The aforementioned process is virtually identical to a cleaning treatment, whether it be a dry or wet process including vacuum cleaning operations. A preferred embodiment of the invention is to determine a vector pathway in both the time and space domain for the mobile resource such that the specific sub-area within the geofence or more specifically within the location internal to the geofence has an at least two-dimensional contaminant map (that shows either actual physical detection of contaminants, or projected contaminants based on actual or historic traffic patterns including taking into account the passage of mobile resource(s) including guests, patients, staff, etc.). It is a goal of the invention such that dynamic routing system, particularly when time constraints exist between at least two primary tasks limit the ability to perform a decontamination process (e.g., cleaning, vacuuming) within the entire sub-area minimizes the potential for cross contamination or at least minimizes the cost risks due to potential cross contamination. Therefore, the dynamic routing system coordinates a vector pathway that optimizes the decontamination process by prioritizing the decontamination of specific vectors or sub-geofences within the specific sub-area. It is further a feature of the invention to leverage camera or sensor images, whether it be from fixed position camera or sensor devices or roaming camera or sensor devices such as mounted on mobile resource equipment. The system utilizes real-time, historic, and retroactively corrected image mapping to create an updated probability map within the sub-area (that is within the location and/or geofence) assembled by at least one camera or sensor device but preferably from a stitched image assembled from multiple camera or sensors from multiple mobile resource equipment plus additional fixed position camera or sensors. The system has at least two maps of the sub-area, one of which is the contaminant probability map and the other is the mobile resource pathway map of assembled vectors (plus task coverage offset preferably represented by a vector having a width to cover the task coverage offset). A particularly preferred embodiment has an at least $3^{rd}$ sub-area map for each known disease state being tracked such that a contaminant source pathway provides a time stamped (i.e., utilize the time color code for incidence, which can optionally be overlaid by intensity representing the frequency of exposure) vector. Each of the maps are preferably represented by the inventive feature of the vector having a time (color code) within the space domain.

Figure 8:
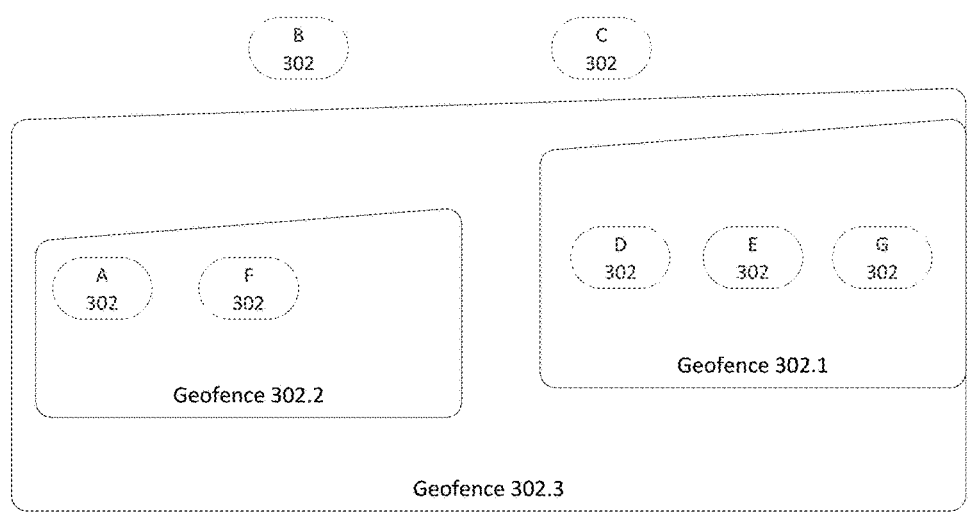
FIG. 8 is a top-view illustration of nested geofences.

Turning to FIG. 8, FIG. 8 depicts the potential (and typical) overlapping of geofences such that exemplary locations B302 and C302 are external of a building represented as a whole by geofence 302.3. The building can have multiple floors or distinct areas, such that the decontamination requirements are distinct, such as a first distinct area being a hospital ICU as location geofence 302.2 having rooms A302 and F302, and a second distinct are being patient rooms in geofence 302.1 having rooms D302, E302, and G302. It is understood that different types of geofences (i.e., physical structures) have the commonality of nested geofences having further nested locations within those geofences.

Yet another feature is that the "roaming" mobile resource can be a person, a robot that has certifications or qualifications as well as ranking of performance in comparison to other mobile resources. The dispatcher of secondary tasks has an acceptance or rules-based system interface so as to selectively establish a preference or a rejection of performing secondary tasks as made available by the dynamic routing and scheduling system. It is understood that the performance of secondary tasks may lead to the missing of a primary task. It is also understood that rejecting a secondary task may lead to the secondary task becoming a firm scheduled primary task by a set of parameters including mandatory completion. The DRS seeks to minimize the cost of potential risks associated with missing the performance of primary tasks or secondary tasks at a system aggregate level. Such cost of the potential risk is a factor of many parameters notably the seriousness of consequences associated with either missing or delaying the execution of a primary or secondary task. In general it is understood that primary tasks should never be missed due to the scheduling of a secondary task.

The notion of primary and secondary tasks can be in virtually any location; however, it is most relevant in locations that are public spaces such as airports, train stations, hospitals, office buildings, shopping malls, schools, restaurants, and neighborhoods where activities such as cleaning, sterilizing, cutting lawn|veggies, logistics including energy storage take place).

Figure 4:
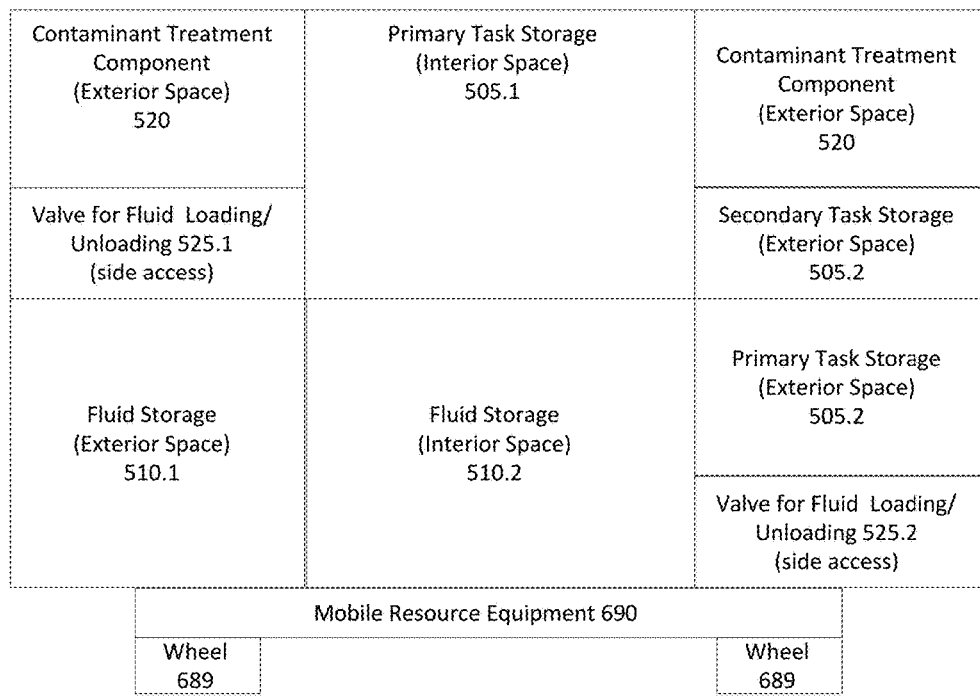
FIG. 4 is a cross-sectional view of a mobile resource.

Turning to FIG. 4, FIG. 4 depicts a cross-section view of the mobile resource equipment 690 (though it is understood that the equipment can be replaced by a person carrying components to execute both a primary task and a secondary task which are shown as components within the primary task storage 505.1 or secondary task storage 505.2 (with further differentiation being between the interior space (i.e., not requiring direct physical access) and exterior space (i.e., requiring direct physical access or having the ability for movement from an interior space to an exterior space through means known in the art). A particularly suitable method of providing access from interior storage to exterior storage (or access) is for fluid storage in an interior space 510.2 through a valve for fluid loading/unloading 525.2. An already exterior fluid storage 510.1 can provide fluid access for fluid loading/unloading via an immediate placed piping and control valve as known in the art 525.1. One exemplary secondary task is decontamination via contaminant treatment component 520 such that movement of the mobile resource equipment 690 can easily achieve its primary tasks with intermittent execution of secondary tasks (e.g., decontamination or cleaning). The mobile resource equipment 690 moves from a first location to a second location via means as known in the art, which includes the most likely wheels 689. It is understood that other means of movement as known in the art include flying, sliding, or conveyors.

Another feature of the invention is the notion of a dynamic speed such that the speed required to maintain traffic flow, if too fast (or too slow) for performing a secondary task reduces the secondary task effectiveness (therefore, want to keep track of not only requirement for performing secondary task within a location/geofence, but also the effectiveness of performing the task/event/operation such that the subsequent requirement to repeat the secondary task in the future is accurately represented (i.e., how well the task for the specific location was performed in the past has an impact on the next occurrence of that same task for that same location). A particularly important instance of this task is centered around reducing the cross-contamination of hospital acquired infections "HAI". A range of potential intermediate events (i.e., tasks such as surface cleaning, deep washing, UV disinfecting etc.) have corresponding discrete incremental values associated with the relative degree of reducing probability of cross-contamination, as well as a range of time impact (i.e., the potential persistence of that task post performing the task). The combination of degree of reducing probability of cross-contamination with time impact persistence provides the DRS with a rules-based logic in which the intermediate event (i.e., secondary task) switches to a known scheduled event (it must be cleaned again by a certain time i.e., becomes a primary task). The DRS also tracks utilization for a specific location/geofence to base that utilization rate in determining the frequency or time interval of a task (e.g., cleaning rate), which is furthermore also a function of the serious nature of disease and probability of being contaminated.

All of the aforementioned is involved in the routing function for a sole primary task. Other parameters and functions involved in the dynamic routing include parameters as a function of (utilization, detection of abnormalities, time since last occurrence of primary task within the multiple pathways that can occur, occupancy along the pathway, occupancy adjacent to the pathway in which noise could impact); cluster of devices traveling the pathways communicate detection of abnormalities such that subsequent mobile resources travel pathways to correct for abnormalities (i.e., a specific area is dirty or different than it was in the past).

One exemplary instance is for a cluster of mobile resources performing cleaning, such that the cluster communicates to a system that tracks the aggregate/collective pathways so as to direct mobile resources to complete the determined gap(s) of non-cleaned pathways (e.g., scheduling/routing of secondary tasks). The mobile resources can also be moving product from point A to B (such as restocking inventory of stores) and/or moving people from point A to B. The specific objectives of a secondary task, such as when it involves the potential for cross-contamination, is the probability of a mobile resource passing on contaminants within the specific geofence or to subsequent mobile resources (as well as non-known patients, guests, staff, etc.) is a f(t, time since last exposure to a known contaminant, time since last cleaning of objects interacting with known contaminant). Other secondary tasks include cleaning, vacuuming, moving packages, being social, doing a task such as folding laundry, cutting veggies, etc.

Turning to FIG. 5, FIG. 5 depicts the data structure from the mobile resource 690 perspective in its execution of primary tasks 301.1 as shown. It is understood that the data structure is virtually identical for secondary tasks (though not shown). FIG. 5 is exemplary of the use case whereby secondary tasks are cleaning and/or decontaminating of nature (which can be used interchangeably). The mobile resource 690 during its movement between locations as depicted to or from a specific location identified by its location record 302 is through at least one mobility pathway 225 with each occurrence represented by a vector path record 226 within a geofence therefore having a parent-child relationship with that geofence having a geofence record 300. The total area (or volume when decontamination is required on walls as well and not just the floor) requiring decontamination is virtually always greater than the single-pass decontamination achieved by the mobile resource 690. Therefore it is vital and a feature of the invention to maintain a record of each instance of decontaminated area such that subsequent passes within the geofence have a different mobility pathway 225 with the objective of achieving the secondary task (of decontamination) for the entire total area (with minimal additional travel time and distance) so as to not hinder the successful completion of the primary task 301.1 prior to its required completion time of which at least one primary task 301.1 is scheduled/assigned to the specific mobile resource 690. Each mobile resource 690 has an optional operator resource 697 and in virtually all instances has transported resources either that are fundamental to the mobile resource 690 itself or being placed within the various storages as per FIG. 4 in which the primary task is a logistics function including the movement of a fixed asset having a fixed asset record 215 from a first location to a second location or in which the primary task is to perform an operation event having an operating event record 101 on a fixed asset 215 in the location 302. The presence of a guest having a guest record 228 having a mobility pathway 225 takes a specific vector path having a vector path record 226 within a specific geofence having a geofence path record 227 where the guest has a mode identified via a mode record 222 (such that the mode is indicative of the guests specific impact on environmental contamination while protecting the privacy of the guest itself). The guest mobility pathway 225 and its mode 222 records may optionally lead to an unscheduled task 309 that can range from needing immediate attention through an operating event record 101 or remain in-queue on an as required basis. The scheduling of primary tasks is driven, in this use case, by the combination of contaminant events 101 which are further characterized by its contaminant source 105 having distinct though potentially linked via parent-child relationships to at least the primary task 301.1 (so as to define the parameters in which the mobile resource operates it decontamination procedures once assigned to the specific mobile resource) and also linked (though not shown) to the location record 302 in which the contamination took place. The location 302 is within a geofence 300 and both have their records stored within a database 205 that is further located within a database server within a datacenter 200 (that can be on-site or off-site).

Turning to FIG. 6, FIG. 6 has the operational parameters when the mobile resource (though not shown) has its secondary tasks centered around movement of energy storage assets from a first location to a second location whether it occurs concurrently of primary tasks or if in fact the otherwise secondary tasks become primary tasks through mobile resource reconfiguration from a primary to a secondary task fulfillment device. The movement of energy storage assets, which can be electrical, fuel, or thermal means as known in the art, are characterized by a set of parameters including electricity production historic records as f(t), electricity consumption historic records as f(t), demand consumption historic records as f(t), demand production historic records as f(t), vehicle transport route historic records as f(t), electricity rate structure historic records as f(t), electricity demand rate historic records as f(t), vehicle transport rate structure historic records as f(t), transactions inflow:outflow ratio historic records as f(t), distance & route from rate structure historic records as f(t), vehicle transport cargo utilization historic records as f(t), vehicle transport energy utilization historic records as f(t), electricity production projected records as f(t), electricity consumption projected records as f(t), demand consumption projected records as f(t), demand production projected records as f(t), vehicle transport route projected records as f(t), electricity rate structure projected records as f(t), electricity demand rate projected records as f(t), vehicle transport rate structure projected records as f(t), transactions inflow:outflow ratio projected records as f(t), distance and route from rate structure projected records as f(t), vehicle transport cargo utilization projected records as f(t), and/or vehicle transport energy utilization projected records as f(t).

Retroactive Location Gap Filling and Accuracy Improvement Functions

There are significant issues associated with location accuracy, notably such as within indoor locations or within outdoor locations of particular note being an urban (e.g., high-rise) area. This demands a high-precision method to correct for these location gaps, though the correction process doesn't necessarily need to take place on a real-time basis. One exemplary instance is the ordering of an object on-line such that the business fulfilling the order wants to verify the order issuer in which the then location knowledge is substantially improved as a method to prevent or limit fraud by way of retroactively filling in the known location gaps. Since the taking of the order is not always concurrent to the fulfillment of the order, and more particularly the shipping with receiving of the items ordered, a retroactive update of the location gap prior to the actual receiving of the items ordered provides the ability to prevent fraud from taking place (and most importantly avoiding the bulk of the costs associated with a fraudulent transaction).

The inventive system is capable of "gluing/stitching together" a mobile resource pathway utilizing a location specific device such that a comprehensive location specific data profile can be created even though real-time location signal may not be known in real-time (i.e., could be because of indoors, etc.). The system features a "retroactive" location engine application that establishes location confirmation of location pathways having uncertainty where the uncertainty is at least one of the time or space domains. This is a critical feature of the system, as the then future (but now past in terms of retroactive location correction) enables superior accuracy in establishing the mode (of the mobile resource, whether a mobile piece of equipment or a "roaming" person) and thus subsequently all mode dependent or deterministic data. Filling gaps in location data, which are a reality of location determining methods whether it be an inherent variability of the location determination method (i.e., sensors, Global Positioning System "GPS", wireless triangulation), errors due to internal reflection or lack of line-of-sight GPS, or just dynamic interference attributed to mobile resource position (or co-located people or objects) creating dynamic or static error, is vital to the confirmation of task performance, or establishing mode for the mobile resource. Retroactive location gap filling enables improved accuracy for essentially all future location dependent data and operations particularly in an environment in which a high degree of repetition is performed by the mobile resource or other entities in which the mobile resource interacts with.

Another exemplary application where precise location can be retroactively provided is for infection control. An instance of infection takes place at a second time that is both different and after a first time at which the potential for cross-contamination has taken place. Increased location accuracy is vital for determining time and space convergence between multiple mobile resources, and their location-specific operations. This is particularly important in an exemplary application of determining cross-contamination probability for determining infection exposure. The nature of most systems and applications that will leverage the inventive location vectors have the execution of primary and secondary tasks on a repetitive basis, though different mobile resources (which each may have unique error factors) may execute the tasks from a first instance to a next instance, enabling a probabilistic model to be utilized to calculate or adjust for repetitive and known (from historical data) gaps in data or errors in offset of location reference points. A particularly important area for infection control is within healthcare facilities. It is an advantage for the DRS such that patterns are obtained for the majority of the mobile resources (e.g., doctors, nurses, pharmacists, cleaning staff, food transporters, etc.) such that this historic database of locations also enables a historic database of location error corrections is accumulated. Each of the aforementioned mobile resources also has a significant quantity of primary tasks, which are often precisely tracked for incidence time and location (such that the location is precisely known, as well as time). The convergence of multiple mobile resources within a location threshold limit is vital to determining the probability, limiting the cross-contamination potential, and managing the performance of both primary and secondary tasks to statistically reduce the incidence of infections. The preferred embodiment of the DRS for infection control includes the tracking of infection control assets ranging from disinfectants having immediate infection reset state(s), combination disinfectant with persistent reset state(s) as a function of time since the identified potential cross-contamination or time since the resetting of state (e.g., cleaning, disinfecting, antimicrobial remedy, etc.).

Figure 11:
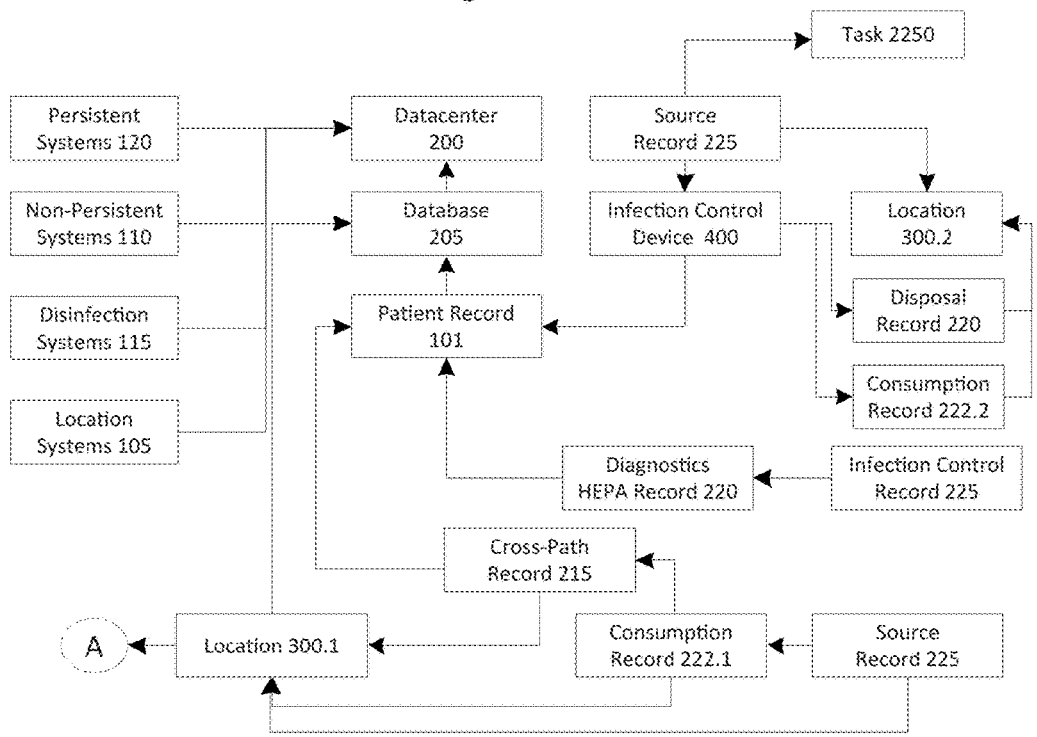
FIG. 11 is a data structure for the mobile resource use case of infectious disease.

Turning to FIG. 11, FIG. 11 depicts the data structure specific to the use case of cleaning/decontamination tasks achieved as predominantly secondary tasks 2250. The establishment of secondary (or primary) tasks are a function of persistent disinfection systems 120, non-persistent systems 110, or general disinfection systems 115 (all having parameters of effectiveness that are disease specific across time since exposure of contaminant and since application of disinfection (whether general, persistent, or non-persistent)) at each location 300.1 coordinated by the location system 105. The aforementioned systems are an integral component of the server system at the datacenter 200 with each record being part of a database 205. Each patient (used interchangeably with any person or source of contamination) record 101 has a record also part of a database 205. Each source of contamination has vector representation across time and space domains with each having a record identifying the cross-contamination pathway 215 further having a parent-child relationship with a specific location 300.1 (that can be further defined as a geofence). Each contamination source (i.e., patient) 101 is characterized by the type of contamination as contained within a diagnostics HEPA record 220 further containing individual records for each disease state in the infection control record 225. The patient disease state can be treated via infection control device 400 such that the present infection control treatment and original source identification of disease state 225 determines the specific nature of tasks 2250 required for reducing cross-contamination. A further feature of the system includes the disposal 220 of materials utilized in the infection control device 400 at a second location 300.2 (or any other location including the same first location) then becoming a potential contamination source at that second location. The treatment of infection control 400 can occur over multiple individual treatments each of which creates a consumption record 222.2. Non-patient specific items can be consumed at a given location 300.1 as indicated by a consumption record 222.1 with an original source record 225. Another exemplary of said location specific consumption can be food (which is subsequently identified as contaminated) with as yet unknown consumer.

Notably, this significant reduction in location gap or increasing in probability likelihood, enable an at least one prior uncertain location vectors or geofence (having an even larger probability uncertainty) to optimally enable the replacement of geofences (i.e., representing location uncertainty) with known location vectors. It is understood that the resulting location vectors will likely have uncertainty in the time domain, though a reasonable means to project vectors with more accurate time domains (i.e., color) is to utilize average speed (whether it be from historic data specific to the average of multiple mobile resources in the same geofence, location, or sub-area; or average speeds between like distances on a historic basis for the mobile resource itself). Another inventive method to reduce location knowledge gaps is to include precise knowledge of locations within a geofence of additional locations (e.g., bathrooms, patient rooms, restaurants, water fountains) even when these additional locations are not directly relevant to the execution of a primary or secondary task by the mobile resource within the specific geofence, location, or sub-area. The ability to infer, whether it be from known blind-spots within the aforementioned additional locations or calculated by significant deviations from the norm in time spent within the geofence, location or sub-area increases the probability of the mobile resource spending time within the aforementioned additional locations. Since the additional locations are both known in terms of relative location and functionality relative to mobile resource(s), this inclusion of data is important to leveraging particularly the known functions in the respective additional locations in combination with mode data to determine and provide superior contextual information in the execution of future decision making and/or inference engine. In other words, the inventive features in the retroactive location engine providing even simple knowledge of the mobile resource presence provides important information in establishing mode (or further contextual information utilized in the future) or determination of future outcome probabilities, as well as probability assessments of past activities (such as secondary tasks or events, or notably non-tracked activities that are location deterministic e.g., probability of a second patient touching a door knob that could have been touched by a first patient prior to the second patient and also prior a secondary cleaning task being performed on that same door knob). The further inclusion of historic records in which a mobile resource has visited, including frequency per unit of time, time interval (i.e., average, mean, shortest, longest) between similar events is vital to increasing the probability accuracy for future retroactive location determination. This is further of importance when the mobile resource is within a geofence (i.e., building) in which a wide range of tasks can be performed (e.g., eating, going to bathroom, shopping, exercising, etc.). In fact, the utilization of historic records for different locations, particularly when those locations have historic pathway records where the location probabilities have higher certainties (e.g., standalone restaurants, stores) create more accurate time of day probabilities and time interval probabilities of the function from known function of the aforementioned additional location(s). The system is able to make assumptions in filling in location gaps by GPS vectors due to losses (or erroneous location determination) in GPS signal data (e.g., indoors, outdoors but urban downtown setting that creates errors due to GPS signal reflection, etc., traveling underground/airplane) and probability data estimates particularly in the probability of performing an intermediate (i.e., secondary) task and for the purpose of predicting next activity (i.e., a primary task or secondary task) or even for enhancing the accuracy of historic activities (i.e., primary or secondary tasks) as improved historic information enables more accurate real-time information.

The inventive system clearly has the capability of having "big brother" concerns when the mobile resources are people (i.e., human resources, guests, patients, clients, etc.). And yet, the more comprehensive and continuous data information on a precise location, or precise location pathway, or even a precise location geofence with both time and space domain knowledge increases the contextual data segmentation and therefore the accuracy by an inference engine. This poises real privacy concerns and thus demands a further aspect of the invention which is a selective by location mode (with optional integral coupling with geofence, location, or sub-area) to provide restrictive access (or at least restrictive access to decrypted location data) to only contextually relevant data through ensuring only fragmented data access as further characterized below.

Distributed Ledger for Privacy Functions with Selective Fragmented Access

Intimate knowledge of location data, especially with detailed time domain data, in the wrong hands can be utilized in harmful manners. One exemplary is soldiers using a fitness device having GPS tracking that conveyed information on a secret forward operating base location. To overcome the harmful use of precise location vectors with both time and space domain information, it is a feature of the system to make available only summary information when the information request is relevant to a specific mode. An exemplary of this is database records containing summarized data in which the requester obtains data with a GPS coordinate offset in some instances, a time offset in other instances, and in other instances both a GPS coordinate and time offset. A more specific example is for a mode equal to eating, which the relevant contextual information includes a) most recent eating event prior to current time, b) average distance traveled to eating venue, c) average distance from home (or work) to eating venue, d) average time traveled to eating venue, etc. Therefore, database access for eating mode is limited to prepared summaries containing subsets of location data with precise time but GPS offsets for the vectors and geofences themselves. Other offsets utilized by other exemplary modes that also don't require absolute GPS coordinates, but only relative coordinates, vary the real GPS coordinates with offsets established through a security function as a function of time "f(t)" or some other parameter so as to protect the real GPS position of the resource. These activities include exercise, predicting walking|driving travel based on past history (important aspects are type of pathway e.g., paved road, sidewalk, etc.; change in altitude being traveled, traffic lights, etc.), marketing (e.g., walking up and down aisles within store, or shopping mall) though the actual shopping mall doesn't specifically matter (or have to be disclosed) in order to enable superior inference/contextual relevance.

The distributed ledger (i.e., blockchain, or any other means of segmenting a database, or at least access to decrypted data, through at least two encryption/decryption keys, though preferably an encryption/decryption key for each mode, has a comprehensive history of time and geofence location (time and space domain) for each mobile resource (i.e., person/customer/patient), such that at least one of the geofence location and/or mode is the key for gaining access to the specific mobile resource location database. In many instances the mobile resource is used interchangeably with an asset, recognizing that the relevance is for each of the assets that move or have a dynamic physical location. A vector is calculated and provided that fills in the location gaps of time based on probability models driven by either a) like assets, b) specific history across time and space domain for the specific asset, c) and the mode that is known closest in time to the gap in known location. The mode as noted earlier can include parameters such as category of activity (e.g., eating, cleaning, exercising, patient, etc.). The need to have access to location data varies by activity type (e.g., shopping, eating, driving, exercising, etc.), mode type (e.g., work, home, vacation, healthcare) and also by the purpose of obtaining data (e.g., predicting purchasing product|venue, eating venue, wellness indicator, financial wellness stress indicator, travel preferences|routing, exercise, etc.).

Figure 3:
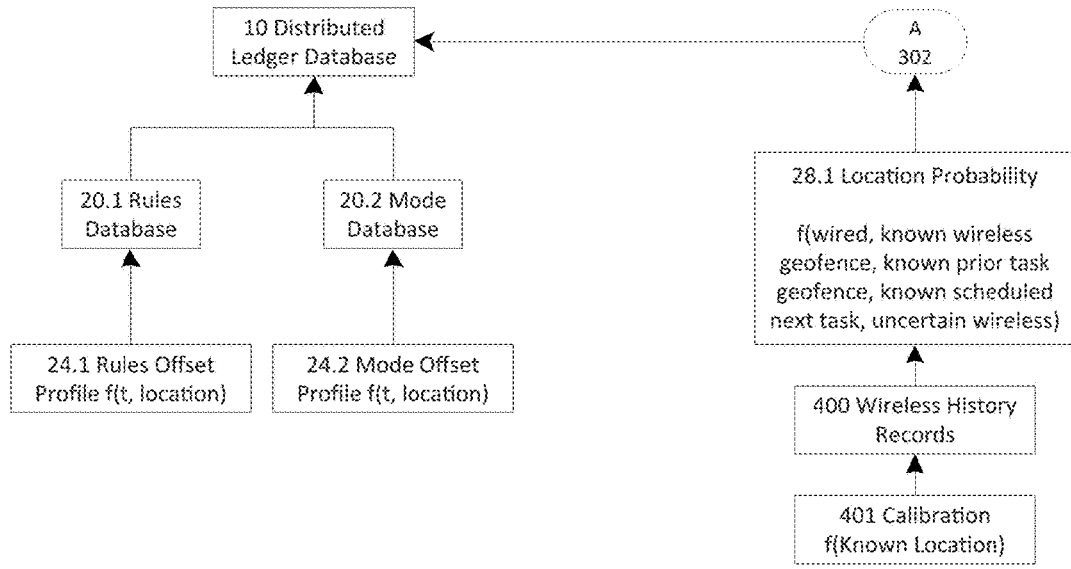
FIG. 3 is a data structure illustration for location specific records using mode as encryption key within a distributed ledger database.

Turning to FIG. 3, FIG. 3 depicts the data structure, in this instance for a mobile resource at location A302, such that the location determination is first improved by at least 5% accuracy through calibration function 401 as a function of at least one known location (i.e., having precise location e.g., accuracy of less than 0.5 meter or preferably less than 0.25 meter or particularly preferred less than 2 cm accuracy) and/or through wireless history records 400 in proximity relevant to this same location A302 (e.g., repetitive movement through a geofence in close proximity to this same location A302 yields wireless history records such as triangulation via known wireless communication methods including WiFi or Bluetooth as known in the art) establish a location probability 28.1 that is a function of wired locations in which tasks occur at a known time, known wireless geofence in which mobile resource wireless signal strength is known to be within said wireless geofence creating a subset geofence in which location A302 must be within, known prior task geofence having an associated known time yielding a calibration point for future use of wireless history records 400, known scheduled next task that provides an increased probability of movement towards the location in which that known scheduled next task must occur (i.e., if the mobile resource is on a $2^{nd}$ floor and the known scheduled next task is also on the $2^{nd}$ floor then movement from the known prior task geofence to the known scheduled next task has a very high probability of also being on the $2^{nd}$ floor and further in between the known locations of the known prior task geofence and the subsequent known scheduled next task), and an uncertain wireless (i.e., such as a repetitive placement of GPS on a different floor, such that the occurrence of the known scheduled next task 'geofence' actual time in combination with the occurrence of the known prior task geofence enables future (as well as retroactive) calibration of location vector despite the otherwise significant error in location. Once the more precise location is determined (whether for future or retroactively) a more precise location vector is created. The knowledge of precise location and location vector, particularly as a function of time, is extremely valuable for establishing intimate and highly personal (when the mobile resource is physically connected to a human) information and thus highly susceptible to privacy intrusions. Therefore, placement of precise location and location vectors requires both methods to enable authorized access to this information yet contextually segmented so as to ensure only proper authorized access to this information even though it is available wherever access to the distributed ledger database 10 is available. This data is therefore encrypted using either or both a rules database 20.1 and/or mode database 20.2 with further data manipulation such that the precise location and location vectors are entered into the distributed ledger database with known (in accordance to the rules database 20.1 and mode database 20.2 respectively by a rules offset profile 24.1 that is a function of at least one time and location and a mode offset profile 24.2 also as a function of at least one time and location.

For those tasks/events/operations/activities of different mode(s), access to other specific mode data is both by permission and still then only in summary form which includes: a) projected times in which mode is expected within a range of start and end time with associated probabilities, with optional probability summary of other modes (if have permission) within that same start and end time; b) frequency of occurrence within a specified geofence and within a range of start and end time; c) #a and #b can be answered by including other specifically known factors including current location of resource/person and the location of the requesting provider as well as additional known resources/people co-located with the mobile resource in which location data is being requested.

Multi-Mode for Multi-Mobile Resource for Combinatorial Mode and Selective Relative Location Access To protect against fraud, the inventive system is able to receive a probability function for a specific mobile resource location being within a specific geofence at a specific time (this could be such that an internet protocol address "IP address" established in the execution of a purchase transaction establishes a location represented by a geofence). When the purchase transaction is performed by a mobile resource linked by location proximity to a known and specific stationary telephone number, then user identifier information or at least a frequent geofence presence is established (which depending on time of day can be indicative of either a home address or work address). Furthermore, the use of real-time location data from a mobile phone in combination with historic data (particularly using repetitive known location data, when the mobile accuracy is high, provides a probability of being in proximity to a home address, work address, and/or other important geofences in that person's life e.g., school, daycare, synagogue, exercise location). These high-probability geofence, location, or sub-area information is critical to establishing a profile for the mobile resource, and then ultimately a mode for that mobile resource.

Another feature of the system is the use of concurrent movement of mobile resources (via precise location of mobile resource or indirectly via co-located mobile phones) to establish a relationship between a resource and a set of people (i.e., individuals linked to other mobile resources) such as a husband's mobile phone moving concurrently with a wife's mobile phone). This linkage is important to establishing (or at least impacting) the mobile resource mode to a higher probability family or vacation mode. Co-located and linked mobile resources, especially when the identity (or profile) of at least one of the mobile resources is known. This scenario enables the profile, and therefore the mode of the mobile resource by being able to differentiate between which mobile resource is performing an activity as compared to the other mobile resource attending such an event (e.g., a parent attending a soccer game). One exemplary use case is for e-commerce transactions such that when the knowledge of which mobile resource is a participant as opposed to an attendee is a vital parameter to establish the probability that each of the mobile resources would be conducting an e-commerce transaction at a specified time and at a specified location. The following shared-vehicle is an exemplary use case for this feature of the invention.

In a shared resource environment, specifically a vehicle (or any wireless device having a known identity), it is possible to then link a person(s) mobile number with the person traveling within that vehicle. The query to the cellphone company(ies) is what vectors are moving together. A likely scenario is that the shared resource has a known GPS but on a different cellular network as the vehicle. A first mobile resource is linked to at least one other mobile resource in which the combination of the two mobile resources establishes not only an interrelationship between the two mobile resources but in fact the further combination of each mobile resource's mode with the other mobile resource's mode provides a combined mode that in fact creates a combined mode for the interrelationship of the first mobile resource and the second mobile resource. It is particularly useful such that knowledge of the second mobile resource (i.e., passenger) prior mode or predictive knowledge of a projected future mode establishes a preferred mode for the combined first mobile and second mobile resource. A specific example is establishing preferred music selection of a passenger (or a set of passengers) during a trip from a first location to a second location. In the event the prior mode for the passenger was exercise then it can be anticipated that the combined mode could be a relaxing mode, or if the projected future mode is exercise it can be anticipated that the combined mode could be an upbeat mode. The collective mode of all concurrent (i.e., traveling together) mobile resources in fact is a critical element to establishing the preferences of the passengers within the shared vehicle. Yet another exemplary is in a mobile resource such as food delivery shuttle such that the execution of a delivery task is linked to the second mobile resource (i.e., the patient) and further could require the presence of a third mobile resource (e.g., dietician) authorized for the delivery task as such may be required in instances of severe food allergies. Another exemplary would be respectively the delivery of pharmaceuticals to a specific patient such that the type of pharmaceutical may dictate a nurse practitioner as in the instance of a controlled substance (e.g., narcotic).

Yet another exemplary where precise location knowledge is important includes credit card transactions. A credit card company desires to know the probability that a specific first mobile resource (i.e., a customer) having a known mobile phone number (which could be another second mobile resource, or in fact in many instances the mobile phone is a proxy for the first mobile resource i.e., it's customer. As noted earlier, this is a vital feature of fraud protection and particularly benefits from the retroactive location gap "filling" for online e-commerce transactions. However, improper access to location data can lead to unintended consequences therefore the DRS should limit/control access to data as the use of historic location data for a specific person when combined with specific time domain information enables one to predict the probability of that same mobile resource not being present at a specific location within a specific time window (e.g., anticipate good times to steal).

Yet retroactive location gap "filling" is not adequate for in-person business transactions as a real-time requirement is necessary since the product delivery/transfer takes place concurrently with the credit card transaction. In order to validate the credit card belongs to (or is authorized by) the proper mobile resource the DRS must access a more comprehensive location analysis and NOT just the real-time location. Due to privacy concerns, the business authorizing the transaction must access the location information for that specified mobile resource linked to the credit card owner and therefore a mode restricted access is important (and in fact a provision to provide a relative location as opposed to an absolute location such as if the credit card owner is actually in the hospital which is very intimate knowledge that isn't relevant to the nature of a credit card transaction taking place elsewhere i.e., an non-authorized transaction. Another aspect of the credit card transaction could be whether a first mobile resource i.e., customer is in close proximity to a second mobile resource i.e., customer's spouse and credit card owner.

Of particular interest would be a) is this "second" mobile resource i.e., person traveling alone?, b) is the "first" mobile resource i.e., vehicle an autonomous vehicle or just a shared-vehicle actually being driven by the second mobile resource or is the second mobile resource a passenger and the third mobile resource is the driver?, c) are the second and third mobile resources related to each other or are they just traveling together (both are useful in also establishing or predicting a mode for the respective mobile resource or in fact the mode for the combination relationship), and if not specifically known what is the typical probability that they are driving or a passenger? Another likely scenario is that a specific mobile resource's real-time location determination signal may not be known (or at least not precisely enough) such that probability is necessary to determine whether the respective mobile resource is within a specific geofence?

And then what is the probability that the mobile resource is doing a specific activity? All of these scenarios can take advantage of inventive features ranging from retroactive location gap filling, multi-mode, and distributed ledger.

Location, location, location is important. But even more important is the location convergence of at least two mobile resources including in approximately the same time domain within the location similarity threshold limit. A fundamental objective is to determine the mode of a specific device operator (i.e., second mobile resource)? The mode(s) of occupants (i.e., third, fourth, . . . mobile resource) within a geofence (which can be a store i.e., static location or a first mobile resource i.e., vehicle? If this person is in a vehicle, what is the probability that they are sick? If this sick person is the driver then additional cleaning procedures may need to take place (which could make a secondary task of performing an interval non-scheduled task into a primary task having a precise scheduled complete by time. A higher probability of sickness increases the emphasis on scheduling a primary task of performing a cleaning, as well as potentially issuing an alert to other mobile resources converging in the approximately same location and time domains.

Dynamic Mode Driven Data Distribution

As noted earlier, mode is a critical element to limiting access to data through utilization of the mode as an encryption/decryption key. Yet it is anticipated that a dramatic increase in mobile resources, particularly autonomous and/or semi-autonomous vehicles, will create a vast network of roaming and mobile computing resources (hereinafter collectively referred to a dynamic cluster computer "DCC" network. The inventive location features are enabling features in a dynamic and distributed datacenter. Mode for virtually all mobile resources not only establishes the encryption/decryption key but additionally establishes the probability of data required for a given time and location domain. The DCC network can also include stationary datacenters, but DCC leveraging distributed ledger and mobile computing resources offer lower latency times, lower transmission distances, inherent redundancy, inherent data security, and enhanced capital asset utilization. The act of moving a mobile resource from one location to another requires an incredible amount of on-board computing power, with virtually all of it not being utilize when the mobile resource is not being utilized. Furthermore, when the first mobile resource (i.e., the shared-vehicle) is carrying an at least one second mobile resource (i.e., passenger) again in autonomous mode there is a significant increase (relative to current operation of a driver in the physical act of driving a traditional non-autonomous vehicle) in data consumption. The combined data access requirements of the vehicle and the passenger provide an opportunity for the on-board data storage to be specific to the specific mobile resources travelling and furthermore the on-board data storage can be more precisely targeted through the mode of the respective mobile resources. When the mobile resource is an electric shared vehicle, the on-board electrical energy storage (i.e., battery) is sized for mobility and NOT computation therefore there is no incremental cost associated with otherwise a traditional datacenters backup power generator(s). Due to the relatively lower physical security of the DCC network, the utilization of the inventive distributed ledger by location mode (or better yet the combined mode for the vehicle and passenger) overcomes the physical security deficiencies with superior encryption/decryption security.

The DCC features methods to dynamically move data to projected locations such that the data that is moved is both as a function of mode, whereby the data-server that is closest or distance compensated to make it otherwise less expensive. Data that is pushed to a specific data-server is also contingent on security policy, privacy, encryption, and type of data. Encryption key is at least comprised of user identifier+mode, preferably geofence+user identifier+mode. In the optimal mode, the data set is leverages container technology as known in the art specifically utilizing caching and prefetching of information to the projected dynamically projected locations (that vary as a f(t, mode).

Figure 9:
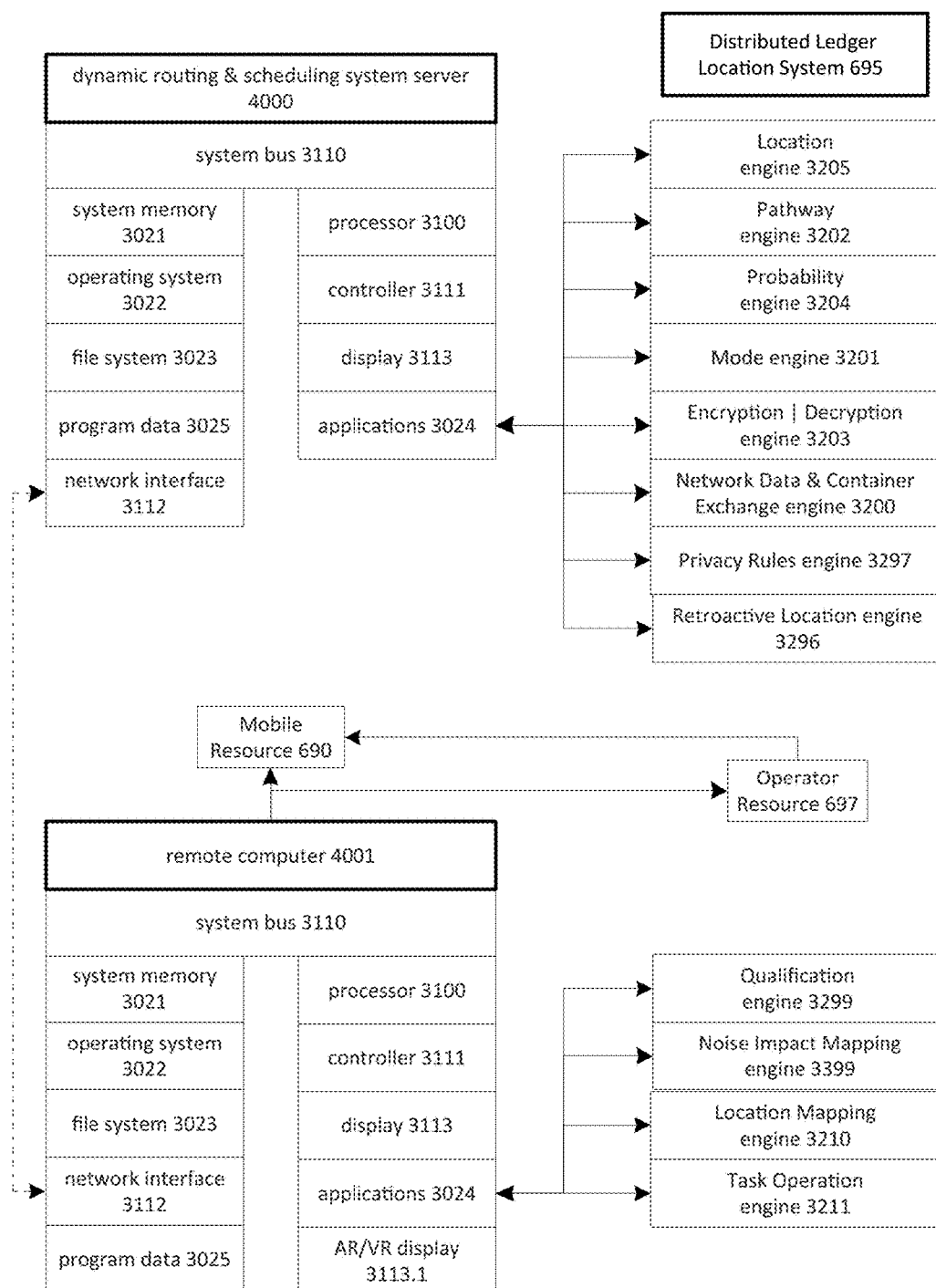
FIG. 9 is a physical and data structure of the mobile system dynamic routing and scheduling system component.

Turning to FIG. 9, FIG. 9 depicts the hardware components for the execution of the mobile resource 690 leveraging the integral dynamic routing and scheduling system server 4000. The mobile resource 690 is at least in intermittent, though preferably continuous, communication with the dynamic routing & scheduling system server 4000 via the wireless network interface 3112. The server 4000 has a system bus 3110 further comprised of system memory 3021, operating system 3022, file system 3023, program data 3025, processor 3100 to execute applications 3024 as coordinated by a controller 3111 with optional display 3113 to an operator coordinating the full execution of the system server (including where the display 3113 is remote from the system server 4000 as known in the art. The system server 4000, though traditional in its nature, the system server 4000 integrates the fundamental and inventive feature of segmenting access to location specific data with authentication as known in the art (e.g., blockchain) though the data itself is encrypted through the encryption (or decrypted through the decryption) engine 3203. The encryption key is further a function of at least one of the mode as established by the mode engine 3201 for each instance of the location as established by the location engine 3205. The privacy rules, as coordinated with the privacy rules engine 3297, establish a second layer of access control by dynamic encryption as a direct function of mode and location. As noted in prior figures, the location utilized is not always precise, therefore the probability engine 3204 is instrumental in improving the accuracy of the location beyond the best available wireless methods (including triangulation) as known in the art through the aforementioned leverage of historic calibration. Additionally, gaps in precise location determination are filled in using the retroactive location engine 3296 to improve not only location precision but also pathways in which the mobile resource 690 travels using the pathway engine 3202. As known in the art data is communicated to networked and distributed hardware, including placing the data in containers as known in the art, through the network data and container exchange engine 3200. The mobile resource 690 can have a co-located or remote operator, such that the mobile resource execution of primary and secondary tasks can be modified via the operator resource 697 using the onboard remote computer 4001. The remote computer 4001 has identical major components in functionality, though understood that the specifications and performance may be different, plus an augmented reality or virtual reality display 3113.1 providing real-time feedback to persons within its current operating vicinity. Each mobile resource 690 has a range of tasks in which it is certified and qualified as coordinated by the qualification engine 3299. Each mobile resource also has a 360-degree noise impact map as both a function of specific operations to fulfill primary and/or secondary tasks and range from mobile resource 690 to other people (e.g., guests, patients, staff, etc.) present as the mobile resource passes by in its movement from a first location to a second location. The noise impact mapping engine 3399 modulates at least one of the pathways in which the mobile resource takes and/or the execution of secondary tasks along the taken pathway, and/or the speed within the pathway, and/or the speed/rate of task execution so as to minimize the noise impact. The location mapping engine 3210 coordinates the precise pathway executed by the mobile resource 690 such that execution of both primary tasks and secondary tasks are effectively achieved, that being such that secondary tasks are sequenced in accordance to the task operation engine 3211 with further operating parameters as established by the noise impact mapping engine after the qualification engine 3299 validates the ability of the mobile resource to adequately perform its assigned tasks.

A significant advantage of the DCC, besides utilization of an otherwise underutilized computational resource, is a significant reduction in wireless bandwidth requirements as the DCC by leveraging location mode as a function of time, is the on-board data storage reduces by at least 10% (as compared to non-onboard data storage) and preferably greater than 50% (and particularly preferred greater than 90%) wireless bandwidth requirements to access data/information that is "custom" curated for the on-board mobile resources (i.e., passengers). The knowledge of on-board mobile resource(s) and the mode for each respective on-board mobile resource is critically important as a mobile resource that is a passenger (as compared to a driver) will require significantly higher access to their respective curated on-board data storage. Knowledge that a person took public transportation today (i.e., location and time domains) with the nature of current and future tasks/activities being known (or at least a probability profile can be established) also establishes a real-time and retroactive determination of mode and therefore a probability profile for then current or future tasks (i.e., e-commerce transaction using credit card). Importantly the use of public transportation provides additional information such as precise task/event location with time domain so as to enhance the performance of the retroactive location gap filling procedure. Superior knowledge of location, mode, and convergence points of multiple co-located mobile resources enables a more accurate prediction of future tasks/activities for the balance of the day (or at least until such time as next destination is reached).

Knowledge of the nature (or probabilistic determination) of activity of a passenger/driver on a shared-vehicle (or any known location/mode combination) enables the DRS to determine the nature of current activity (which is also very important in anticipating the next task/activity for a specified future time domain). For example, the knowledge or probability of any given task/event such as driving, sleeping, eating, exercising, in building, in vehicle including airplane establishes the relative probability of future tasks/events.

Yet another feature of mobile resources converging in both the time and location domains is modulating the execution of predominantly secondary tasks, though primary tasks as well are anticipated, such that the performance of the task has a reduced noise impact amongst co-located mobile resources. This implementation of this feature is as follows in the next section.

Noise Impact Abatement Routing

An inventive feature of the dynamic routing system is taking into account noise tolerance for each sub-area (as defined earlier, being part of a location within a geofence) also a function of noise of activity, proximity to what it passes by and noise sensitivity of what it passes by, occupancy of what it passes by including the nature of activity in which the occupant is doing, time of day, and distance of what it passes by, and function of noise distribution as a function of distance and direction. Using this, the system can also adjust the rate in which it does the intermediate activity as rate of activity can change the noise creation profile.

The system utilizes real-time, historic, and retroactively corrected image mapping to create an updated probability map within the sub-area (that is within the location and geofence) assembled by at least one camera or sensor device but preferably from a stitched image assembled from multiple camera or sensors from multiple mobile resource equipment plus additional fixed position camera or sensors. The system has at least two maps of the sub-area, one of which is the contaminant probability map and the other is the mobile resource pathway map of assembled vectors (plus task coverage offset preferably represented by a vector having a width to cover the task coverage offset). A particularly preferred embodiment has an at least $3^{rd}$ sub-area map for each known disease state being tracked such that contaminant source pathway provides a time stamped (i.e., utilize the time color code for incidence, which can optionally be overlaid by intensity representing the frequency of exposure) vector. Each of the maps are preferably represented by the inventive feature of the vector having a time (color code) within the space domain.

It is understood that noise propagation is a function of the direction of travel for the mobile resource, in addition to the operating condition in which the task performing device on the mobile resource is controlled (e.g., speed of vacuum fan, air flow speed and volume, electric motor, etc.). The system, whether it be issuing a command to the mobile resource to regulate or limit noise (through such means including speed control), as a function of both time and space domain. It is a feature of the system to utilize a sub-area map utilizing the same vector color code to represent relative noise levels within the overall sub-area. It is understood that a distinct noise level map can preferably exist as a function of time (e.g., time of day range), occupancy of adjoining sub-area or geofence or location, as well as additional parameters that are location specific such as within geofence produced noise such as a TV or guest visitation within a hospital or hotel room.

Definition of modes and where they are important WITHIN a geofence and for segmenting database. NOT for transition from one mode to another.

HAI—contaminated, cleaned, potentially contaminated, need cleaning; {time since change of mode}

Definition of a combined mode, such that the mode is dependent on multiple co-located users each having a mode and then having a group mode as a function of each individual mode.

It is understood that the invention includes and anticipates known in the art individual non-contiguous anti-infection spreading methods integrated into a linked and coupled system to increase time and space domain continuity for at least one disease state.

Although the invention has been described in detail, regarding certain embodiments detailed herein, other anticipated embodiments can achieve the same results. Variations and modifications of the present invention will be obvious to those skilled in the art and the present invention is intended to cover in the appended claims all such modifications and equivalents.

What is claimed is:

1. A mobile resource dynamic routing and scheduling system comprised of an at least one mobile resource whereby the mobile resource is a multi-functional resource, wherein the at least one mobile resource having a primary task component and at least one secondary task component, wherein the at least one mobile resource has an at least two primary tasks performed with the primary task component whereby the at least two primary tasks are comprised of a first primary task performed at a first location and a second primary task having a second primary task completion time performed at a second location, wherein the at least one mobile resource has an at least one secondary task performed with the secondary task component whereby the at least one secondary task performed between the first location and the second location, whereby the at least secondary task is completed prior to the second primary task completion time and the second primary task is completed prior to the second primary task completion time, whereby the mobile resource is further comprised of a vision sensor, an onboard computer system, and a communication link to determine a travel movement pathway between the first location and the second location whereby the travel movement pathway avoids an at least one obstruction including an at least one obstruction that prevents the completion of the at least one secondary task between the first location and the second location.

2. The mobile resource dynamic routing and scheduling system according to claim 1 is further comprised of a set of dynamically queued primary tasks and secondary tasks whereby each of the primary tasks and each of the secondary tasks are specifically linked to a specific location.

3. The mobile resource dynamic routing and scheduling system according to claim 1 whereby the travel movement pathway is comprised of a vector of an actual movement pathway of the mobile resource and wherein the vector has an embedded gradient on a time domain whereby the time domain ranges from an earliest starting time to a latest ending time determining an at least one convergence point between the mobile resource and a known location of the from at least one of the first location and the second location, or between a first mobile resource of the at least one mobile resource and a second mobile resource of the at least one mobile resource.

4. The mobile resource dynamic routing and scheduling system according to claim 3 whereby each vector of an aggregate of individual vectors of actual movement pathways is a multi-dimensional mapping whereby the mapping is at least two dimensions whereby the aggregate of individual vectors in the mapping is indicating the performance of secondary tasks completed in its movement between the first location and the second location.

5. The mobile resource dynamic routing and scheduling system according to claim 3 whereby a space between the first location and the second location is a multi-dimensional mapping whereby the mapping is at least two dimensions indicating the space in which at least one secondary task is required and whereby the system schedules a series of individual secondary tasks in the space between the first location and the second location.

6. The mobile resource dynamic routing and scheduling system according to claim 5 whereby the multi-dimensional mapping has a gradient of a completion importance whereby system schedules a sequence of execution of the individual secondary tasks in accordance of the completion importance priority.

7. The mobile resource dynamic routing and scheduling system according to claim 3 wherein the vector has an at least one gap in travel movement between the first location and the second location.

8. The mobile resource dynamic routing and scheduling system according to claim 3 wherein the vector has an at least one probability gradient for the travel movement between the first location and the second location.

9. The mobile resource dynamic routing and scheduling system according to claim 7 whereby the system is further comprised of an at least one historic record of location as determined by concurrent wireless location determination means, and whereby the concurrent wireless location determination is calibrated creating an increased location precision by at least 5% of the at least one gap in travel movement.

10. The mobile resource dynamic routing and scheduling system according to claim 8 whereby the system is further comprised of an at least one historic record of location as determined by concurrent wireless location determination means, and whereby the concurrent wireless location determination is calibrated creating an increased location precision by at least 5% of the at least one probability gradient in travel movement.

11. The mobile resource dynamic routing and scheduling system according to claim 9 whereby the calibrated increased location precision is used to retroactively improve an accuracy of the vector for future utilization of the vector travel movement of the mobile resource.

12. The mobile resource dynamic routing and scheduling system according to claim 10 whereby the calibrated increased location precision is used to retroactively improve an accuracy of the vector for future utilization of the vector travel movement of the mobile resource.

13. The mobile resource dynamic routing and scheduling system according to claim 9 whereby the calibrated increased location precision is used to retroactively improve the accuracy of the vector for future utilization of the vector travel movement of the mobile resource by calibrating the location precision through a known completion of a primary task having a completion time and a known location.

14. The mobile resource dynamic routing and scheduling system according to claim 9 whereby the future utilization of the vector travel movement is an on-line order fulfillment to prevent or limit fraud by means of retroactively using the calibrated increased location precision.

15. The mobile resource dynamic routing and scheduling system according to claim 1 whereby the mobile resource travel movement from and between the first location to the second location is dynamically routed to minimize a noise impact within an at least one geofence whereby the at least one geofence is in between the first location and the second location.

16. The mobile resource dynamic routing and scheduling system according to claim 3 whereby the vector of travel movement of the mobile resource is encrypted and contained within a distributed ledger and whereby the encryption utilizes an encryption key based on a specific mode within a location geofence.

17. The mobile resource dynamic routing and scheduling system according to claim 3 whereby the vector of travel movement of the mobile resource is comprised of a real-time location and a non-real-time location adjustment whereby the non-real-time location adjustment improves the vector's accuracy by at least 5%.

18. The mobile resource dynamic routing and scheduling system according to claim 3 whereby the vector of travel movement of the mobile resource is dynamically altered for privacy using a location offset wherein the location offset is a function of an at least one of time, a mode within a geofence location, and a rules-based logic combining at least two of the time, the geofence location, and the mode within the geofence location.

19. The mobile resource dynamic routing and scheduling system according to claim 1 whereby the mobile resource moves at a speed during its travel movement from a first location to a second location and whereby the speed is dynamically altered as a function of the at least one of the secondary task having a secondary task effectiveness and a noise impact within an adjoining geofence between the first location and the second location.

\* \* \* \* \*